(12) United States Patent
Iida

(10) Patent No.: US 7,861,748 B2
(45) Date of Patent: Jan. 4, 2011

(54) REFUELING FACILITY, REFUELING DEVICE, AND REFUELING METHOD

(75) Inventor: Yasuyuki Iida, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1040 days.

(21) Appl. No.: 11/631,333

(22) PCT Filed: Jul. 12, 2005

(86) PCT No.: PCT/JP2005/013210

§ 371 (c)(1),
(2), (4) Date: Dec. 29, 2006

(87) PCT Pub. No.: WO2006/006715

PCT Pub. Date: Jan. 19, 2006

(65) Prior Publication Data

US 2007/0298313 A1 Dec. 27, 2007

(30) Foreign Application Priority Data

Jul. 13, 2004 (JP) ............................. 2004-206110

(51) Int. Cl.
*B65B 3/04* (2006.01)
(52) U.S. Cl. .......................... 141/95; 141/98; 141/104; 141/392; 439/191
(58) Field of Classification Search .................. 141/18, 141/95, 98, 392; 320/104; 439/191
See application file for complete search history.

(56) References Cited

U.S. PATENT DOCUMENTS

| | | | |
|---|---|---|---|
| 2,966,248 A | 12/1960 | Armbruster | |
| 5,858,568 A * | 1/1999 | Hsu et al. | 429/13 |
| 6,691,749 B2 | 2/2004 | Mulvenna et al. | |
| 2003/0008183 A1 | 1/2003 | Hsu | |
| 2003/0075235 A1 | 4/2003 | Graham | |
| 2003/0127155 A1 | 7/2003 | Mulvenna | |
| 2006/0219448 A1 * | 10/2006 | Grieve et al. | 180/65.3 |

FOREIGN PATENT DOCUMENTS

| | | |
|---|---|---|
| JP | 08-100895 | 4/1996 |
| JP | 2000-324857 A | 11/2000 |
| JP | 2001-238360 A | 8/2001 |
| JP | 2001-239847 A | 9/2001 |
| JP | 2001-277871 A | 10/2001 |
| JP | 2003-104498 A | 4/2003 |

OTHER PUBLICATIONS

Machine Translation of JP 2006-324857, Nov. 24, 2000, Toyota Motor Corp, all pages.*

* cited by examiner

*Primary Examiner*—Timothy L Maust
*Assistant Examiner*—Nicolas A Arnett
(74) *Attorney, Agent, or Firm*—Kenyon & Kenyon LLP

(57) ABSTRACT

A refueling facility (200) according to the present invention comprises a refueling source (210) for refueling a fuel cell vehicle with fuel, a power supply source (220) for supplying power to the fuel cell vehicle, and a controller (230) for controlling refueling and power supply from the refueling facility (200) to the fuel cell vehicle. The forward end of a refueling path (211) and that of a power supply path (221) are integrated into a supply connector (240). The refueling and the power supply are achieved by connecting the supply connector (240) to a fuel receptacle (110) of the fuel cell vehicle.

13 Claims, 5 Drawing Sheets

REFUELING FACILITY, REFUELING DEVICE, AND REFUELING METHOD

This is a 371 national phase application of PCT/JP2005/013210 filed 12 Jul. 2005, claiming priority to Japanese Patent Application No. 2004-206110 filed 13 Jul. 2004, the contents of which are incorporated herein by reference.

BACKGROUND

The present invention relates to a refueling facility for supplying fuel, a refueling device to be refueled by the refueling facility, and a refueling method.

Conventionally, there have been suggested various fuel cell vehicles driven using electric energy, which is output from a fuel cell. This type of fuel cell vehicle is configured to be refueled with hydrogen or other fuels through a fuel hose or the like from a refueling facility.

In order to refuel the fuel cell vehicle, it is necessary to connect the refueling facility to the fuel cell vehicle using a refueling connector of the fuel hose and to connect them to each other using an electrical signal connector to send or receive a signal or the like that indicates the state of the fuel cell vehicle (the temperature or pressure of a fuel storage tank or the like). As described above, conventionally there has been a problem that refueling requires a complicated work.

In view of the circumstances, in recent years there has been provided a technology that the refueling connector is integrated with the electrical signal connector to simplify the connection work between the refueling facility and the fuel cell vehicle (for example, refer to patent document 1).

[Patent document 1] Japanese Patent Laid-Open No. 2003-104498

Incidentally, when the fuel cell vehicle is refueled, there is such a problem that a battery runs out after the refueling or the like due to power consumption of power consuming devices (for example, a lighting device, an air conditioner, a temperature control mechanism, and other auxiliary machines mounted on the vehicle) during the refueling in addition to the above problem. For example, the fuel cell vehicle is provided with a high pressure tank mounted thereon for storing fuel to be supplied from the refueling facility, and the temperature control mechanism may control the temperature of the tank during the refueling in some cases. Due to large power consumption caused by the temperature control mechanism, the battery runs out if the temperature control mechanism continues to be operated during the refueling, which leads to such a problem that the vehicle cannot be started after the refueling.

SUMMARY

The present invention has been provided in view of the above problems. Therefore, it is an object of the present invention to provide a refueling facility and the like capable of improving the performance stability of a moving object after refueling or the like.

To solve the above problem, according to one aspect of the present invention, there is provided a refueling device (fuel device) for a moving object with a fuel tank for storing fuel to be supplied and a battery for supplying power to a power consuming device (for example, an auxiliary machine) mounted on the moving object, comprising a refueling connector for refueling the fuel tank from an outside facility and a power supply connector for supplying power to at least the battery from the outside facility.

According to the above configuration, the refueling device comprises the refueling connector for refueling the fuel tank from the outside facility such as the refueling facility and the power supply connector for supplying power to the battery, and therefore the refueling device can be supplied with power in addition to the fuel. This enables the fuel cell vehicle to be improved in performance stability without occurrence of such a problem that the battery runs out, even if the power consuming device (for example, an auxiliary machine such as a temperature control mechanism) has continued to be operated during the refueling.

In the above, the power consuming device mounted on the moving object can be a power generator in the moving object (for example, a device for converting electric energy of a motor or the like to mechanical energy) in the moving object, a heat generator (for example, a device for converting electric energy of a heater or the like to heat energy), a light generator (for example, a light), a sound generator (for example, an audio system for the moving object), or a complex device formed by combining the foregoing devices.

Moreover, the auxiliary machine for the moving object as an example of the power consuming device is a secondary device mounted on the moving object. It can be a drive unit for a device related to traveling of the moving object (for a vehicle, for example, a steering, a suspension, or a brake), a device for achieving comfort of a passenger compartment (for example, an air conditioner, or a room light), a device for improving operability (for example, a light, a wiper, or lighting of an operator panel), and a device for supporting the drive of a main drive unit (for example, an engine, a generator, a motor, or a fuel cell) in an auxiliary manner (for an internal combustion engine, for example, an oil pump or a cooling pump; for a fuel cell, for example, a compressor, a hydrogen pump, or a cooling pump) or can be understood as including various sensors or an electrical control unit (ECU) of the system.

In the above configuration, preferably the fuel and the power can be supplied from the outside facility to the moving object at a time.

Furthermore, in the above configuration, preferably the refueling device further comprises a receptacle in which the refueling connector is integrated with the power supply connector.

Still further, in the above configuration, preferably the power consuming device (for example, an auxiliary machine) operates with power supplied at least during the refueling, and the refueling device is supplied with the fuel from the outside facility via the receptacle while it is supplied with the power from the outside facility via the receptacle.

In the above configuration, the power consuming device (for example, an auxiliary machine) can be a temperature control mechanism of the fuel tank.

In the above configuration, preferably the refueling device further comprises control means for detecting the state of charge of the battery and controlling the power supply from the outside facility to the battery according to a detection result.

Furthermore, in the above configuration, preferably the control means supplies the power from the outside facility to the battery if the state of charge of the battery is equal to or lower than a preset first reference value. Moreover, in the above configuration, the battery can also be a high voltage battery used as a power supply source for running of the moving object.

Furthermore, in the above configuration, the battery can include a high voltage battery used as a power supply source for running of the moving object and a low voltage battery used as a power supply source for an auxiliary machine of the moving object connected to the high voltage battery (in other words, a power supply source for an auxiliary machine connected to the high voltage battery) and the control means can supply power from the high voltage battery to the low voltage battery upon detecting that the state of charge of the low voltage battery is equal to or lower than a preset second reference value.

Still further, the fuel is preferably gas fuel and the fuel tank is preferably a high pressure fuel tank or a fuel absorbing alloy tank.

Furthermore, in the above configuration, preferably the refueling device further comprises a status signal line for sending or receiving a status signal to or from the outside facility and the receptacle includes the refueling connector, the power supply connector, and an electrical signal connector disposed at the forward end of the status signal line, all of which are integrated into the receptacle. In the above, the status signal preferably includes a signal indicating the status of the fuel tank or the status of the battery. In addition, the receptacle is preferably provided with a ground wire.

According to another aspect of the present invention, there is provided a refueling facility for a moving object comprising: a refueling source; a power supply source; a refueling connector for refueling the moving object from the refueling facility; and a power supply connector for supplying power to the moving object from the power supply source.

In the above configuration, preferably the refueling facility comprises a supply connector into which the refueling connector and the power supply connector are integrated.

In the above configuration, preferably the refueling facility further comprises a status signal line for sending or receiving a status signal to or from the moving object and the supply connector includes the refueling connector, the power supply connector, and an electrical signal connector disposed at the forward end of the status signal line, all of which are integrated into the supply connector. In the above, the status signal preferably includes a signal indicating the status of the fuel tank mounted on the moving object or the status of the battery mounted on the moving object. In addition, the supply connector is preferably provided with a ground wire.

According to still another aspect of the present invention, there is provided a refueling method wherein an outside facility equipped with a refueling source and a power supply source supplies a moving object, which has a fuel tank, a power consuming device, and a battery for supplying power to the power consuming device, with fuel from the refueling source to the fuel tank and with power from the power supply source to the battery at a time.

In the above method, preferably the fuel and the power are supplied at a time if the state of charge of the battery is equal to or lower than a first reference value.

DETAILED DESCRIPTION

Preferred embodiments of the present invention will be described below with reference to the accompanying drawings.

A. First Embodiment

Figure 1:
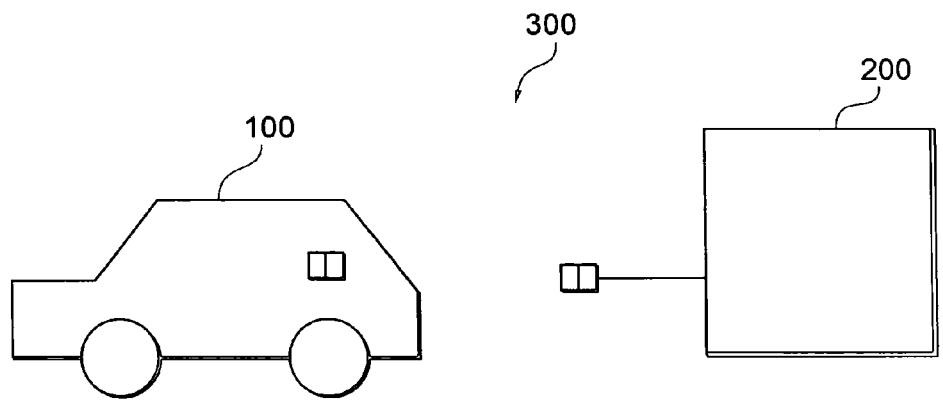
FIG. 1 is a diagram showing the configuration of a refueling system according to a first embodiment.

Referring to FIG. 1, there is shown the configuration of a refueling system 300 according to a first embodiment. The refueling system 300 includes a fuel cell vehicle 100 running on hydrogen and a refueling facility 200 for supplying fuel and power to the fuel cell vehicle 100. While the fuel cell vehicle running on hydrogen is exemplified in this embodiment, the present invention is also applicable to a fuel cell vehicle running on ethanol or the like. In addition, the present invention is also applicable to a hybrid car or a gasoline car similarly, as well as the fuel cell vehicle. In other words, the fuel in the present invention can be gas fuel (hydrogen gas or natural gas) or liquid fuel (gasoline, ethanol, light oil, or liquid hydrogen). Furthermore, while a vehicle (moving object) is assumed as a target to which the refueling system 300 is applied in this embodiment, the present invention is applicable to all kinds of movable bodies such as, for example, a ship and an airplane.

Figure 2:
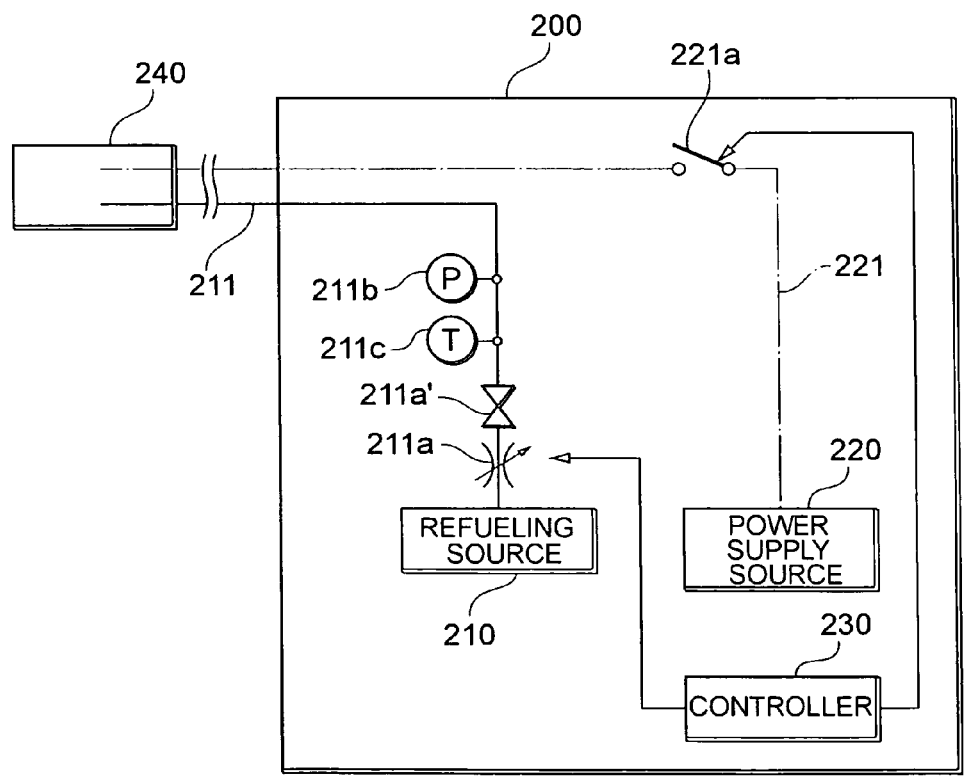
FIG. 2 is a diagram showing the configuration of a refueling facility according to the first embodiment.

Referring to FIG. 2, there is shown the configuration of the refueling facility 200. The refueling facility 200 includes a refueling source 210 equipped with a high pressure pump (not shown) and so forth for pressurizing hydrogen as fuel, a power supply source 220 for supplying power to the fuel cell vehicle 100 during refueling, and a controller 230 for controlling the supply of the fuel and power from the refueling facility 200 to the fuel cell vehicle 100.

While the hydrogen gas as fuel gas is supplied from the refueling source 210 to the fuel cell vehicle 100 through a refueling path 211, the power is supplied from the power supply source 220 to the fuel cell vehicle 100 through a power supply path 221. As shown in the figure above, the forward end of the refueling path 211 and the forward end of the power supply path 221 are integrated into a supply connector 240. In other words, the refueling connector is integrated with the power supply connector by the supply connector 240 in this embodiment. This enables the fuel and the power to be supplied at a time by connecting the connector 240 of the refueling facility 200 with a fuel receptacle (described later) provided in the fuel cell vehicle 100. Furthermore, the fuel and the power are supplied from the refueling facility 200 to the fuel cell vehicle (moving object) 100 at a time, which improves the operability of a refueling operation in the refueling facility 200.

In the above, there are disposed on the fuel supply path 211 a flow control valve 211a for controlling a flow rate during refueling of the fuel cell vehicle 100, a shut-off valve 211a' that takes an "open" state during refueling and a "closed" state after refueling under the control of the controller 230, a pressure sensor 211b for detecting a pressure during refueling, and a temperature sensor 211c for detecting a temperature during refueling. On the other hand, there is disposed on the power supply path 221 a switch 221a for controlling the ON/OFF state of the power supply to the fuel cell 100. The controller 230 controls power supply by controlling the open/closed state of the switch 221a, for example, based on a detection signal of a sensor for detecting an attached/detached state of the supply connector 240. Similarly, the controller 230 controls refueling by controlling the open/closed state of the shut-off valve 211a' or the like based on the detection signal of the sensor or a detection signal of the pressure sensor 211b or the temperature sensor 211c.

Figure 3:
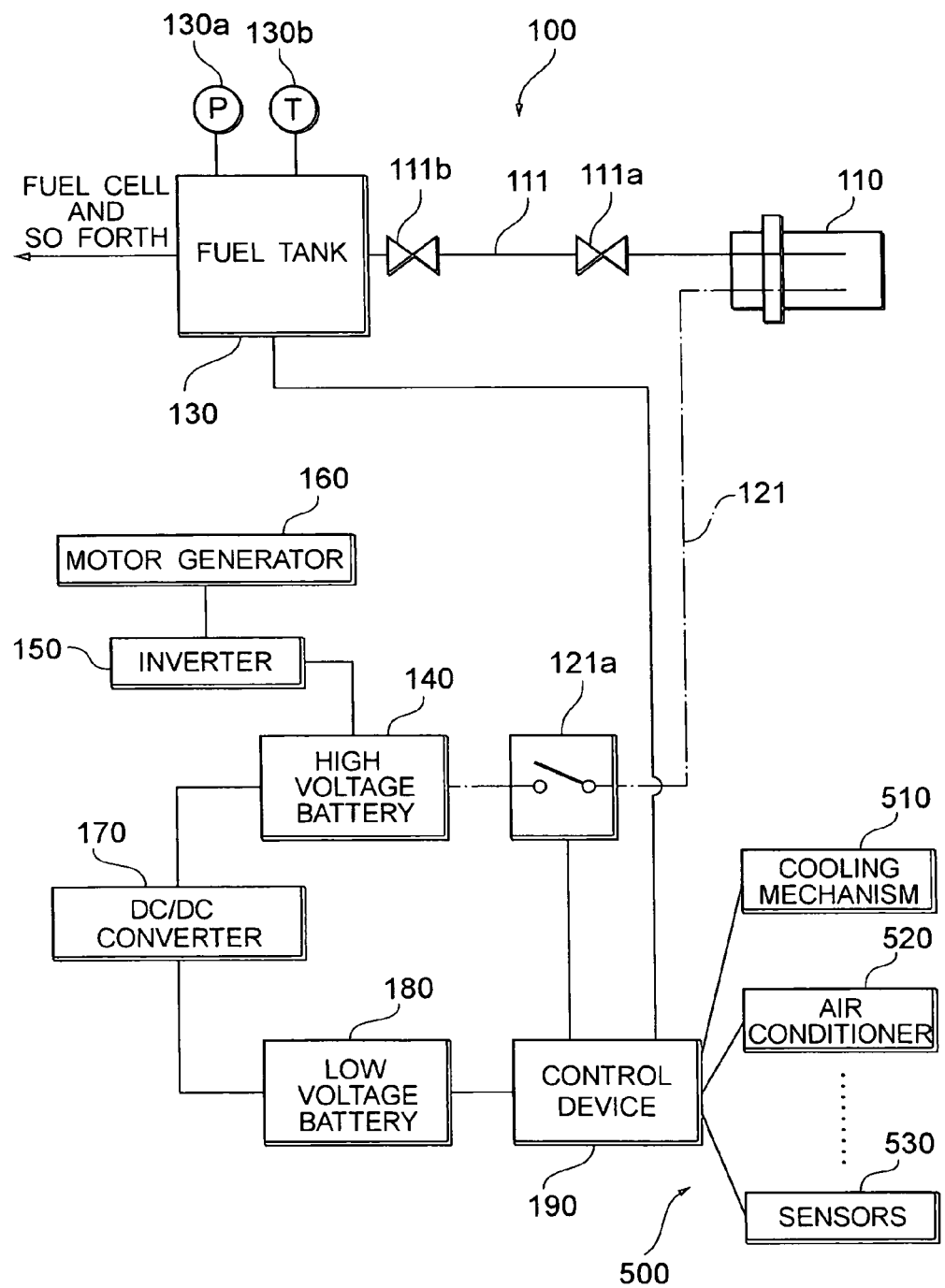
FIG. 3 is a diagram showing the configuration of a fuel cell vehicle according to the first embodiment.

Referring to FIG. 3, there is shown the configuration of a refueling device (fuel device) of the fuel cell vehicle 100. The fuel receptacle 110 is provided inside a fuel lid (not shown), which is disposed on the surface of the vehicle body of the fuel cell vehicle 100, and the forward end of the refueling path 111 and the forward end of a power supply path 121 are integrated into the fuel receptacle 110. In other words, the refueling connector is integrated with the power supply connector by the fuel receptacle 110 in this embodiment. The fuel supplied from the refueling facility 200 is stored in the fuel tank 130 through the refueling path 111 from the fuel receptacle 110, while the power from the refueling facility 200 is supplied from the fuel receptacle 110 to a high voltage battery 140 through the power supply path 121.

The fuel tank 130 is a high-pressure storage tank for storing fuel supplied from the refueling facility 200 under pressure. While a high-pressure hydrogen tank is assumed as a fuel tank in this embodiment, the present invention is also applicable to a hydrogen absorbing alloy tank or the like. A shut-off valve 111a for electro-magnetic control and a stop valve 111b functioning as an inlet of the fuel tank 130 are disposed in the refueling path 111 from the fuel receptacle 110 to the fuel tank 130. On the other hand, the fuel tank 130 is equipped with a pressure sensor 130a for detecting an internal pressure of the fuel tank 130 and outputting a pressure signal and a temperature sensor 130b for detecting an internal temperature of the fuel tank 130 and outputting a temperature signal, and these signals are supplied to a control device 190. The control device 190 controls the shut-off valve 111a, the stop valve 111b, and so forth between open and closed states based on the signals supplied from the above sensors.

The high voltage battery 140 plays the role of a power supply source for running and is connected to a motor generator 160 via an inverter 150. As the high voltage battery 140, it is possible to employ, for example, a nickel metal hydride battery, a lithium ion battery, or a capacitor. A switch 121a for controlling power supply to the high voltage battery 140 is disposed in the power supply path 121 from the fuel receptacle 110 to the high voltage battery 140. The control device 190 detects whether the supply connector 240 is connected to the fuel receptacle 110 based on the detection signal sent from a sensor, which is not shown. Upon detecting that the supply connector 240 is connected to the fuel receptacle 110 so as to enable the refueling and the power supply, the control device (control means) 190 monitors the state of charge (SOC) of the high voltage battery 140 and determines whether the high voltage battery 140 should be supplied with power from the refueling facility 200.

For example, if the state of charge (SOC) of the high voltage battery 140 is equal to or lower than a preset reference value V1 (a first reference value), the control device 190 controls the power to be supplied from the refueling facility 200 by turning on the switch 121a. On the other hand, if the state of charge (SOC) of the high voltage battery 140 is higher than the reference value V1, the control device 190 shuts off the power supply from the refueling facility 200 by turning off the switch 121a. The control device 190 controls the power supply to the high voltage battery 140 in this manner. The amount of power supplied to the high voltage battery 140, the reference value V1, and so forth can be appropriately changed according to user's operations or the like.

The motor generator (power consuming device) 160 generates a driving force to be given to drive wheels (not shown) by means of power supplied from the high voltage battery 140. The motor generator 160 can serve as both a motor and a generator. More specifically, if the motor generator 160 serves as the motor, power stored in the high voltage battery 140 is supplied to the motor generator 160 via the inverter 150. The drive control of the motor generator 160 at that time is achieved by the control of the inverter 150. On the other hand, if the motor generator 160 serves as the generator, the generated power is sent to the high voltage battery 140 via the inverter 150. At that time, the amount of power generation of the motor generator 160 is controlled by regulating the electric energy sent to the high voltage battery 140 via the inverter 150.

Moreover, the high voltage battery 140 is connected to the DC-DC converter 170, which is a power converter. The DC-DC converter 170 plays the role of lowering the output voltage of the high voltage battery 140 and supplying the power to a connected low voltage battery 180.

The low voltage battery 180 plays the role of a power supply source to auxiliary machines (power consuming devices) 500 such as a cooling mechanism (temperature control mechanism) 510 for cooling the fuel tank 130 during refueling or the like, an air conditioner 520, and various sensors 530. The control device 190 controls the power supply from the high voltage battery 140 to the low voltage battery 180 and controls the power supply from the low voltage battery 180 to the auxiliary machines 500 while monitoring the state of charge (SOC) of the low voltage battery 180. The power supply from the high voltage battery 140 to the low voltage battery 180 will be described in detail below. Upon detecting that, for example, the supply connector 240 is connected to the fuel receptacle 110 to enable the refueling and the power supply, the control device 190 monitors the state of charge (SOC) of the low voltage battery 180 and determines whether the low voltage battery 180 should be supplied with power from the high voltage battery 140.

For example, if the state of charge (SOC) of the low voltage battery 180 is equal to or lower than a preset reference value V2 (<V1) (a second reference value), the control device 190 controls the power to be supplied from the high voltage battery 140 to the low voltage battery 180 via the DC-DC converter 170. On the other hand, if the state of charge (SOC) of the low voltage battery 180 is higher than the reference value V2, the control device 190 controls the power supply not to be supplied from the high voltage battery 140 to the low voltage battery 180. The control device 190 controls the power supply from the high voltage battery 140 to the low voltage battery 180 in this manner. The amount of power supplied to the low voltage battery 180, the reference value V2, and so forth can be appropriately changed according to user's operations or the like in the same manner as for charging the high voltage battery 140.

Figure 4:
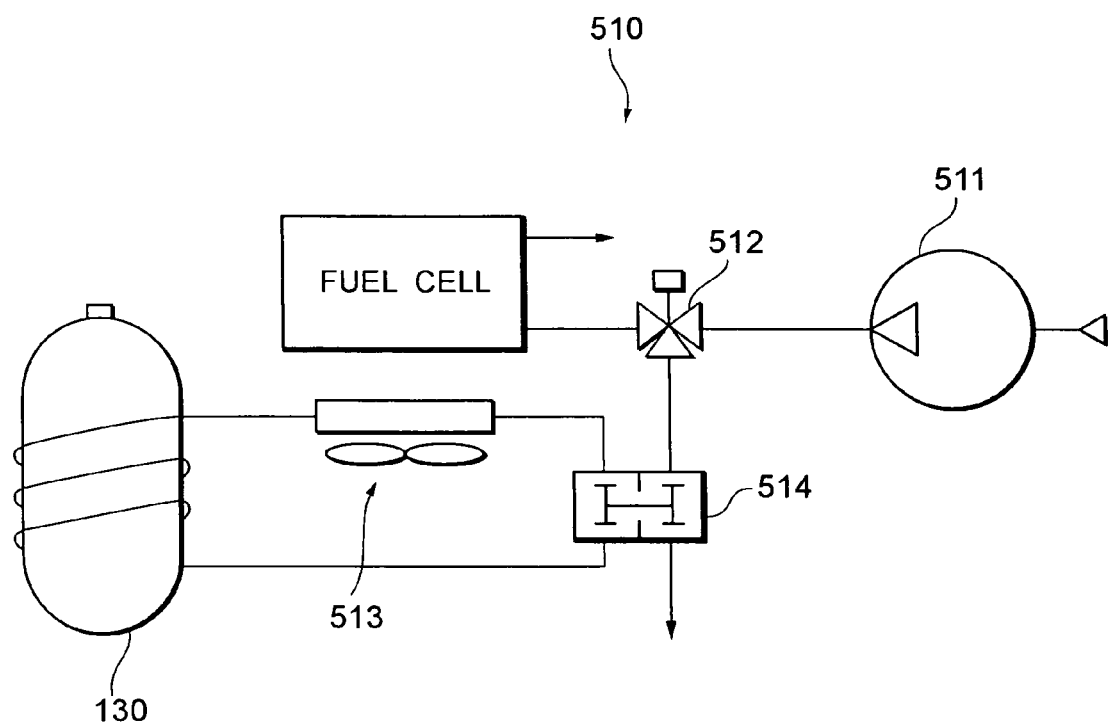
FIG. 4 is a diagram showing the configuration of a cooling mechanism according to the first embodiment.

Referring to FIG. 4, there is shown the configuration of the cooling mechanism (temperature control mechanism) 510 mounted on the fuel cell vehicle 100.

As is generally known, heat is generated as the fuel tank 130 is refueled (filled) with hydrogen gas. To discharge the heat generated during refueling of the fuel tank 130 with the hydrogen gas, the cooling mechanism 510 as shown in FIG. 4 is mounted on the fuel cell vehicle 100 in this embodiment.

The cooling mechanism 510 includes an air compressor 511 for blowing air into a cathode of the fuel cell, a three-way valve 512, a condenser 513, and a compressor 514. The air compressor 511 is supplied with power from the high voltage battery 140 and supplies air to the fuel cell, while the three-way valve 512 changes the destination to which the air discharged from the air compressor 511 is supplied between the fuel cell position and the condenser position. To cool down the fuel tank 130, the three-way valve 512 is switched to the condenser position. In this embodiment, refrigerant is condensed in the condenser 513 by using the pressure of the air supplied by the switching to the condenser position and the temperature of the refrigerant is lowered by evaporating the refrigerant in an evaporator, which is not shown. By employing the above configuration, the compressor 514 for circulating the refrigerant or other devices can be reduced in size. This configuration is illustrated only and what kind of cooling mechanism should be employed can be appropriately changed according to the design or the like of the fuel cell vehicle 100.

While the cooling mechanism 510 has been described hereinabove as an example of the auxiliary machines 500 operated during refueling, the same applies to the air conditioner 520 and the sensors 530. More specifically, in cases where refueling takes time, the ambient temperature in the vehicle rises if the air conditioner 520 is turned off. Therefore, it is necessary to allow the air conditioner 520 to continue to be operated in order to maintain a comfortable temperature in the vehicle. Furthermore, in order to grasp the temperature or pressure of the fuel tank 130 or the states of the various batteries during refueling, it is necessary to allow the various sensors 530 for sensing these states to continue to be operated.

While there is a need to operate the various auxiliary machines 500 during refueling as described above, power is supplied as well as fuel during refueling of the fuel cell vehicle 100 from the refueling facility 200 according to the refueling system 300 of this embodiment, and therefore it becomes possible to improve the performance stability of the fuel cell vehicle 100 after refueling or the like. In other words, it is possible to prevent such a problem that the vehicle cannot be started after refueling since the battery runs out due to the operation of the auxiliary machines 500 during the refueling. Although it is assumed that refueling is performed substantially simultaneously with power supply in the above embodiment, the refueling and the power supply can also be performed at different timings. In addition, the high voltage battery 140 can be used, instead of the low voltage battery 180, as the power supply source for supplying power to the auxiliary machines 500.

B. Second Embodiment

Figure 5:
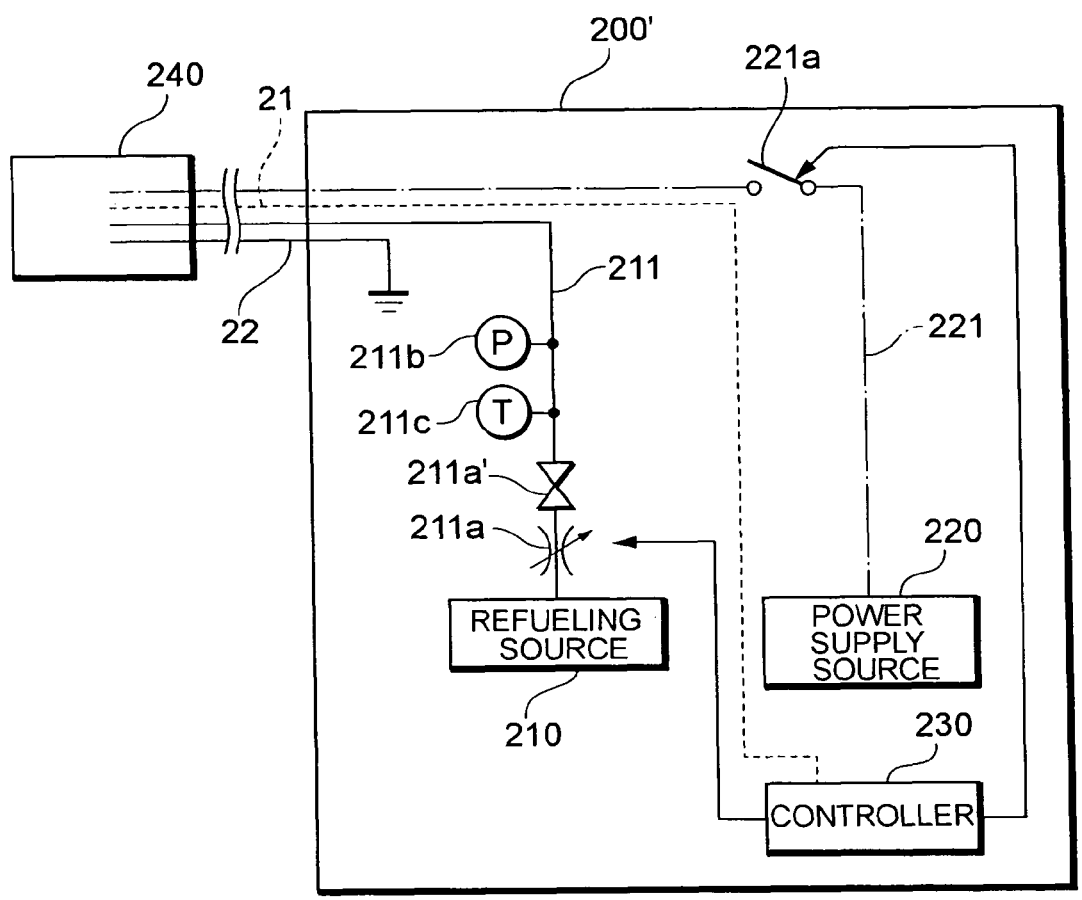
FIG. 5 is a diagram showing the configuration of a refueling facility according to a second embodiment.
Figure 6:
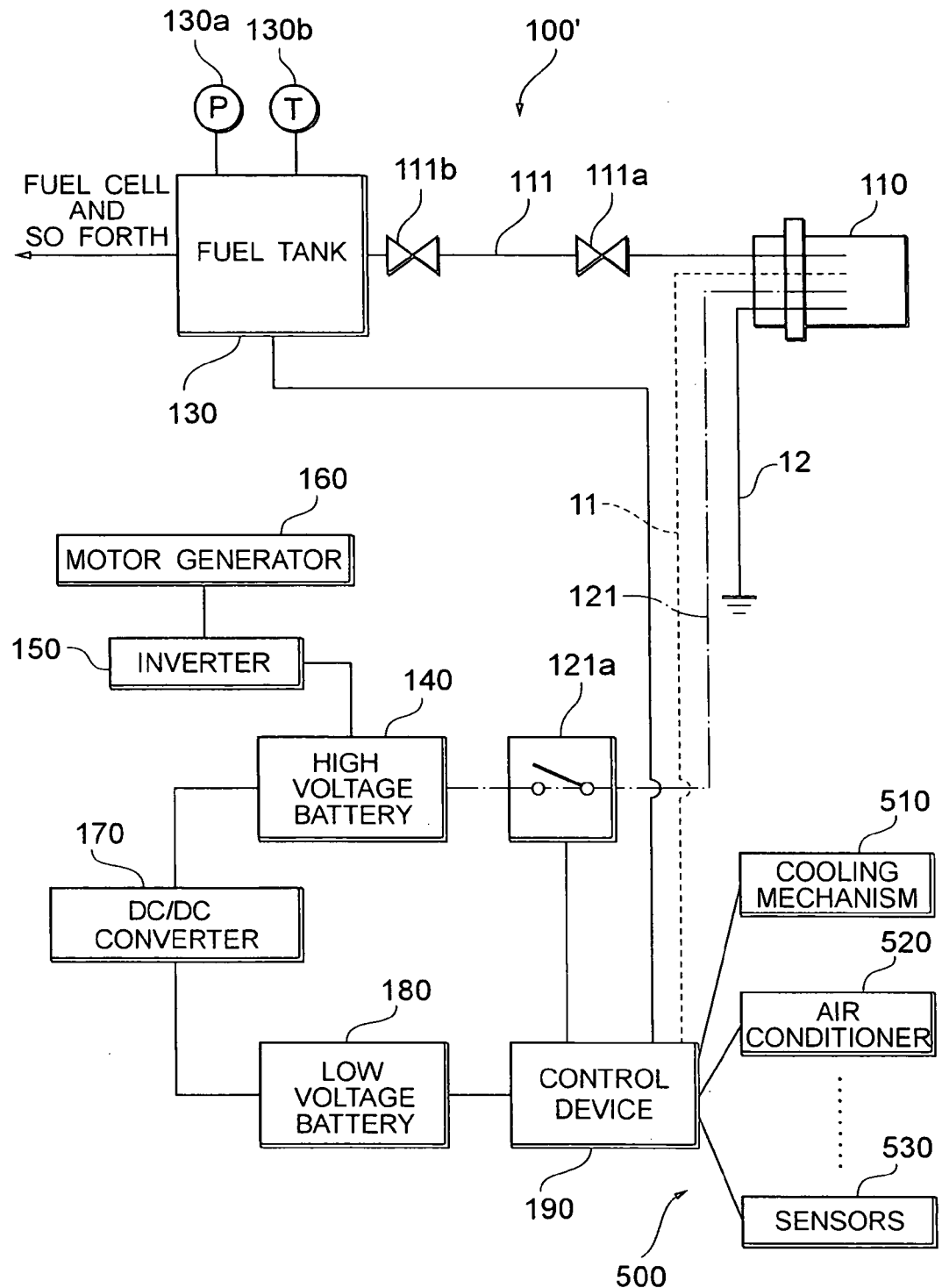
FIG. 6 is a diagram showing the configuration of a fuel cell vehicle according to the second embodiment.

Referring to FIG. 5, there is shown the configuration of a refueling facility 200' according to a second embodiment. Referring to FIG. 6, there is shown the configuration of a refueling device (fuel device) of a fuel cell vehicle 100' according to the second embodiment. Regarding the refueling facility 200' shown in FIG. 5 and the fuel cell vehicle 100' shown in FIG. 6, the same reference numerals are used to denote corresponding parts to those of the refueling facility 200 shown in FIG. 2 and those of the fuel cell vehicle 100 shown in FIG. 3 and their detailed description is omitted here.

The refueling facility 200' is provided with a status signal line 21 for sending or receiving a status signal to or from the fuel cell vehicle 100. One end of the status signal line 21 is connected to a controller 230 and the other end (the forward end of the status signal line 21) is connected to a supply connector 240. In other words, a refueling connector, a power supply connector, and a status signal connector are integrated into the supply connector 240.

On the other hand, the fuel cell vehicle 100' is provided with a status signal line 11 for sending or receiving a status signal to or from the refueling facility 200'. One end of the status signal line 11 is connected to a control device 190 and the other end (the forward end of the status signal line 11) is connected to a fuel receptacle 110. In other words, a refueling connector, a power supply connector, and a status signal connector are integrated into the fuel receptacle 110. The status signal includes, for example, a signal indicating the temperature or pressure of a fuel tank 130, a signal indicating the state of charge (SOC) of a high voltage battery 140 or a low voltage battery 180, and a signal indicating the operating state of each of auxiliary machines 500. What kind of signals should be sent or received to or from the refueling facility 200' can be appropriately changed.

Upon connection between the fuel receptacle 110 of the fuel cell vehicle 100' and the supply connector 240 of the refueling facility 200' in the above configuration, a connection is established between the status signal lines 11 and 21 as well as between refueling paths 111 and 211 and between power supply paths 121 and 221. The controller 230 of the refueling facility 200' determines the amounts of fuel and power supplied and refueling timing, for example, based on the status signals indicating the temperature and pressure of the fuel tank 130 of the fuel cell vehicle 100', the states of charge of the high voltage battery 140 and the low voltage battery 180, the operating state of each of the auxiliary machines 500, and so forth, which are supplied via the status signal line 21 and starts the refueling and power supply according to the determined contents.

In this manner it is also possible to control the amounts of fuel and power supplied, the refueling timing, and so forth by sending or receiving the status signals between the refueling facility 200' and the fuel cell vehicle 100'. While the present invention has been described by way of the above embodiment in which the refueling facility 200' and the fuel cell vehicle 100' are provided with only the status signal line 11 and the status signal line 21, respectively, it is also possible to provide them with ground wires 12 and 22 (see FIG. 5 and FIG. 6), respectively, in addition to these status signal lines. This enables secure grounding during refueling.

C. Others

The functions of the controller 230 of the refueling facilities 200 and 200' and the control device 190 of the fuel cell vehicles 100 and 100' according to the embodiments described hereinabove are achieved by executing a program stored in a memory by a CPU (or a DSP). Therefore, the program can be recorded in a recording medium such as a CD-ROM and distributed or can be distributed via a communication network such as the Internet.

The present invention is useful in that it can improve the performance stability of a moving object after refueling or the like and it can be widely used for refueling facilities and refueling devices required to improve the performance stability.

I claim:

1. A refueling device for a moving object, the moving object having a fuel tank for storing fuel, a first battery for supplying power to a motor for generating a driving force of the moving object, a power consuming device which operates when the fuel tank is refueled, a second battery for supplying power to the power consuming device, and a power converter which is provided between the first battery and the second battery, the refueling device comprising:

a refueling connector for refueling the fuel tank from an outside facility;

a power supply connector for supplying power to at least the first battery from the outside facility; and control means for controlling the power supply from the outside facility to the fuel tank and the power supply from the first battery to the second battery via the power converter, wherein the control means is programmed to be capable of performing the refueling of the fuel tank simultaneously with the power supply to the first battery and the power supply from the first battery to the second battery via the power converter.

2. A refueling device for a moving object according to claim 1, wherein the refueling connector is integrated with the power supply connector.

3. A refueling device for a moving object according to claim 2, wherein the refueling connector, the power supply connector, and an electrical signal connector disposed at the forward end of a status signal line are integrated into a connector.

4. A refueling device for a moving object according to claim 3, wherein a status signal includes a signal indicating the status of the fuel tank or the status of the battery.

5. A refueling device for a moving object according to claim 3, wherein the integrated connector is provided with a ground wire.

6. A refueling device for a moving object according to claim 1, wherein the control means detects the state of charge of the first battery and controls the power supply from the outside facility to the first battery according to a detection result.

7. A refueling device for a moving object according to claim 6, wherein the control means supplies the power from the outside facility to the first battery if the state of charge of the first battery is equal to or lower than a preset first reference value.

8. A refueling device for a moving object according to claim 1, wherein the control means supplies power from the first battery to the second battery upon detecting that the state of charge of the second battery is equal to or lower than a preset second reference value.

9. A refueling device for a moving object according to claim 1, wherein the fuel is gas fuel.

10. A refueling facility for refueling a moving object, the moving object having a fuel tank for storing fuel, a first battery for supplying power to a motor for generating a driving force, and a power supply unit for supplying power to a power consuming device operating with power supplied from the first battery during refueling, the refueling facility comprising:

a refueling source;

a power supply source;

a refueling connector for refueling the moving object from the refueling source;

a power supply connector for supplying power to the moving object from the power supply source;

a status signal line for transmitting a status signal indicating the state of charge of the first battery from the moving object; and control means for detecting the state of charge of the first battery and controlling the power supply from the power supply source to the first battery according to a detection result, wherein the refueling of the fuel tank, the power supply to the first battery, and the power supply to the power supply unit can be performed at the same time.

11. A refueling facility for a moving object according to claim 10, wherein the refueling connector is integrated with the power supply connector.

12. A refueling facility for a moving object according to claim 11, wherein the refueling connector, the power supply connector, and an electrical signal connector disposed at the forward end of the status signal line are integrated into a connector.

13. A refueling facility for a moving object according to claim 12, wherein the integrated connector is provided with a ground wire.

* * * * *